United States Patent

[11] 3,620,537

[72] Inventors Robert M. Conklin;
Ralph E. Witucki, both of Muskegon, Mich.
[21] Appl. No. 870,748
[22] Filed June 23, 1969
[45] Patented Nov. 16, 1971
[73] Assignee Brunswick Corporation
Original application Oct. 24, 1971, Ser. No. 588,856, now Patent No. 3,501,152.
Divided and this application June 23, 1969, Ser. No. 870,748

[54] GOLF GAME
10 Claims, 10 Drawing Figs.
[52] U.S. Cl. .................................... 273/185 A,
273/185 B, 35/29 A, 33/66, 346/8, 273/176 L
[51] Int. Cl. .................................... A63b 69/36
[50] Field of Search .......................... 273/176,
184, 185, 183, 54 D, 35; 33/66; 35/29; 346/8;
73/379, 380, 381

[56] References Cited
UNITED STATES PATENTS

| | | | |
|---|---|---|---|
| 2,121,750 | 6/1938 | Vaughan | 273/185 A X |
| 2,131,952 | 10/1938 | House | 33/66 |
| 2,605,557 | 8/1952 | Van Deventer | 35/29 C |
| 3,252,705 | 5/1966 | Cornberg | 273/54 D |
| 3,268,907 | 8/1966 | Parrish | 346/8 |

Primary Examiner—George J. Marlo
Attorney—Hofgren, Wegner, Allen, Stellman & McCord ABSTRACT: A plotting device for use in an indoor golf game having a computer that provides output signals representative of the distance the ball struck from the tee would have traveled in a first direction coinciding with an intended line of flight and in a second direction transverse to the first direction. The plotting device includes a planar map of a hole on a golf course with the map including indicia defining a cup for the hole. The map is supported on a member slidable on a plotting table and is connected to the slidable member by means of a pivotal and releaseable connection. The connection provides for pivotal movement of the map on the supporting member about an axis coincident with the cup and transverse to the plane of the map. Also provided is a reference spot projector which projects a stationary spot of light on the map and a projector for projecting a movable spot of light on the map in response to the output signals from the computer. In use, the map is pivoted on the support member and the support member moved in such a way that the reference spot is located at the point of initiation of a shot on the map. Following computation, the movable spot will then indicate the point of termination of the shot on the map.

PATENTED NOV 16 1971

Inventors:
Robert M. Conklin
Ralph E. Wituchi
By Hofgren, Wegner,
Allen, Stellman & McCord
Atty's

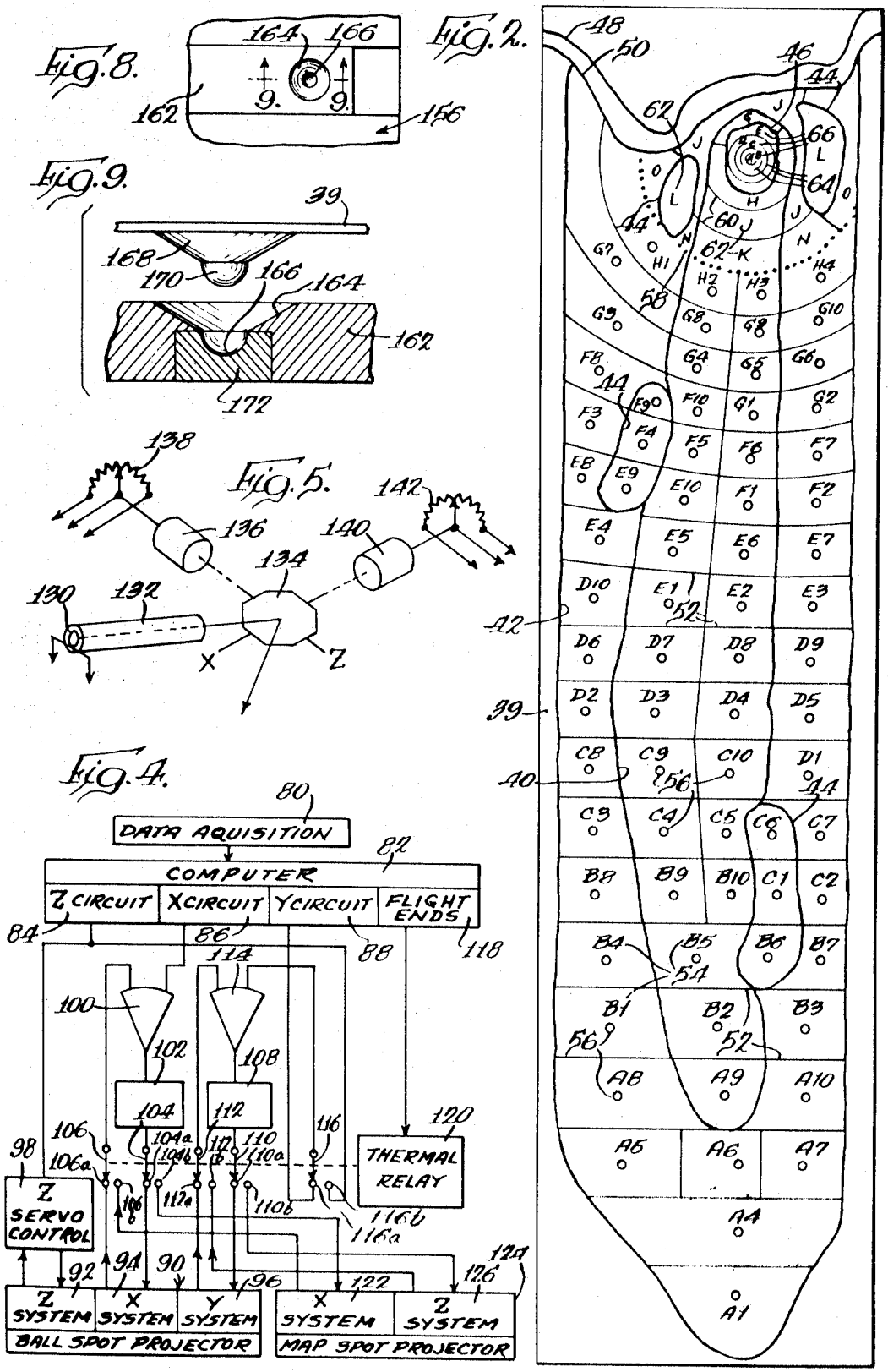

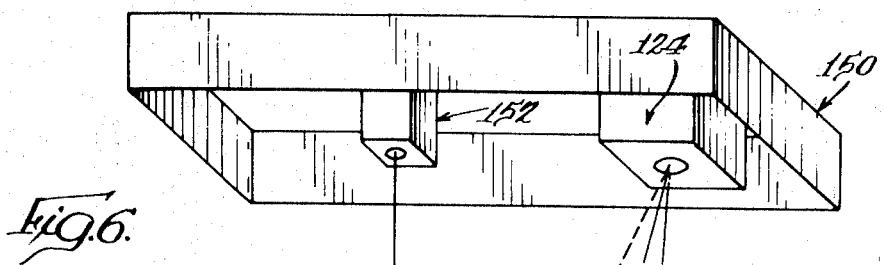
Fig. 6.
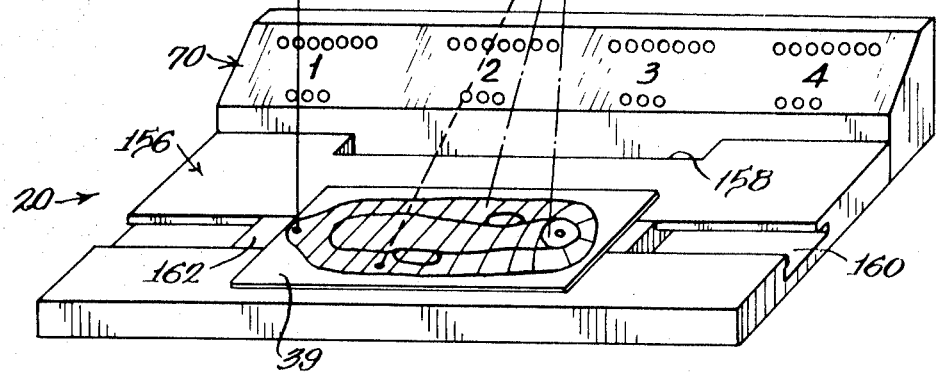
Fig. 7.
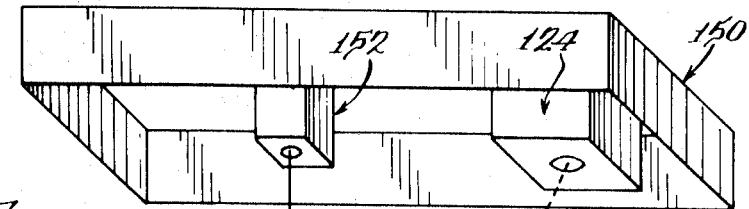
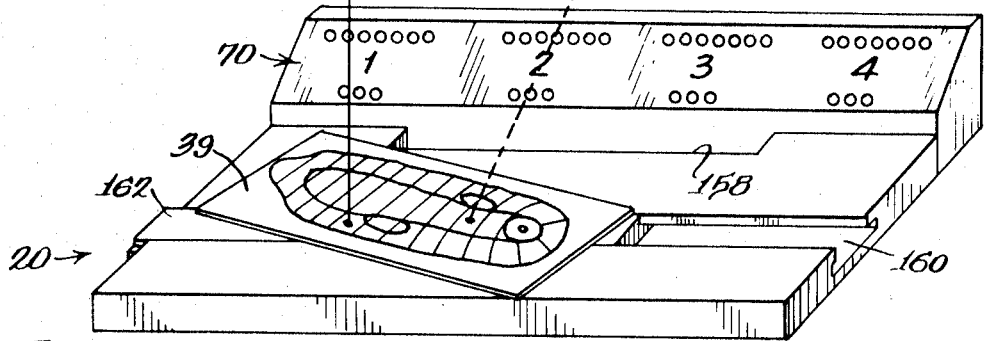
Fig. 10.
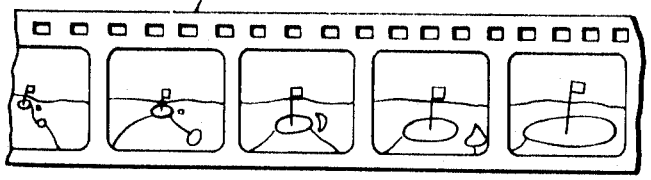

GOLF GAME

This is a division of application Ser. No. 588,856 filed Oct. 24, 1966 now U.S. Pat. No. 3,501,152. In recent years, the increasing number of people taking up the game of golf and the inability of currently existing golf courses to handle the increased number of golfers together with the increasing cost of green fees has caused a rise in the popularity of indoor golf games. Typically, such games permit a golfer to take a full swing at a ball to drive the latter toward a target and wherein computing means are utilized to compute the flight of the ball and provide the golfer with information relative to the flight of the ball so that he may play a golf course from tee to green indoors.

A number of such indoor systems have been proposed and a few have been commercialized. In the latter category, currently existing commercial indoor golf games have generally failed to realistically simulate the playing of golf game on a natural golf course. For example, one commercial form of golf game fails to provide for the factor of spin on a ball and furthermore, neglects the fact that the initial direction of a shot may deviate substantially from the intended line of flight. As a result, the golfer playing such a game immediately recognizes the lack of realism and will often refuse to patronize the game.

Other more realistic systems have been proposed, although not commercialized, that take into account such factors as spin and initial direction of the ball. When these factors are considered, the equipment necessarily becomes more complex in order that the golfer may be informed of the degree of displacement of his shot from the intended line of flight. When the displacement from the intended line of flight is considered, the manner in which subsequent shots are to be computed necessarily becomes more complex because of the displacement of preceding shots. While certain proposed systems provide for the displacement, the means used are extremely complex and are unpractical at least in an economic sense.

It is, therefore, the primary object of the invention to provide a new and improved indoor golf game system.

More specifically, it is an object of the invention to provide a golf game that realistically simulates all of the conditions found on an outdoor golf course while avoiding the use of extremely complex equipment that would render the game economically unpractical for commercialization.

A still further object of the invention is the provision of a plotting device for use in a golf game including means for indicating a reference point and a point movable with respect to the reference point, the indicating means being adapted to locate the movable point in response to the output of a computer, a map of a golf hole including indicia defining a cup location and associated with the indicating means, and means mounting the indicating means and the map for relative movement about a pivotal axis coinciding with the cup location on the map and along a second axis that intersects the pivotal axis.

Another object is the provision of a golf game computing system comprising a means for sensing the flight characteristics of a golf ball struck from a tee, computing means operative in response to the sensing means for computing the theoretical trajectory of a golf ball, a first projector connected to the computing means for moving a spot of light on a scene to provide a visual simulation of the trajectory, a second projector adapted to be connected to the computing means to project a spot of light on a map to indicate the point of termination of the flight of the golf ball and a means for determining when the flight of the ball has terminated and for disconnecting the first projector from the computing means and connecting the second projector to the computing means.

Other objects and advantages will become apparent from the following specification taken in conjunction with the accompanying drawings, in which:

FIG. 2 is a plan view of a map of a golf hole used in playing the golf game;

FIG. 4 is a block diagram of a computing system;

FIG. 5 is a schematic of a projecting device used in conjunction with the map illustrated in FIG. 2;

FIG. 6 is perspective view of a plotting device at one stage in the operation thereof;

FIG. 7 is the perspective view of the plotting device at a stage in the operation thereof subsequent to that illustrated in FIG. 6;

FIG. 8 is a fragmentary plan view of a portion of a plotting device;

FIG. 9 is a vertical section taken approximately along the line 9-9 of FIG. 8; and FIG. 10 illustrates photographic scenes which may be used with the golf game.

Figure 1:
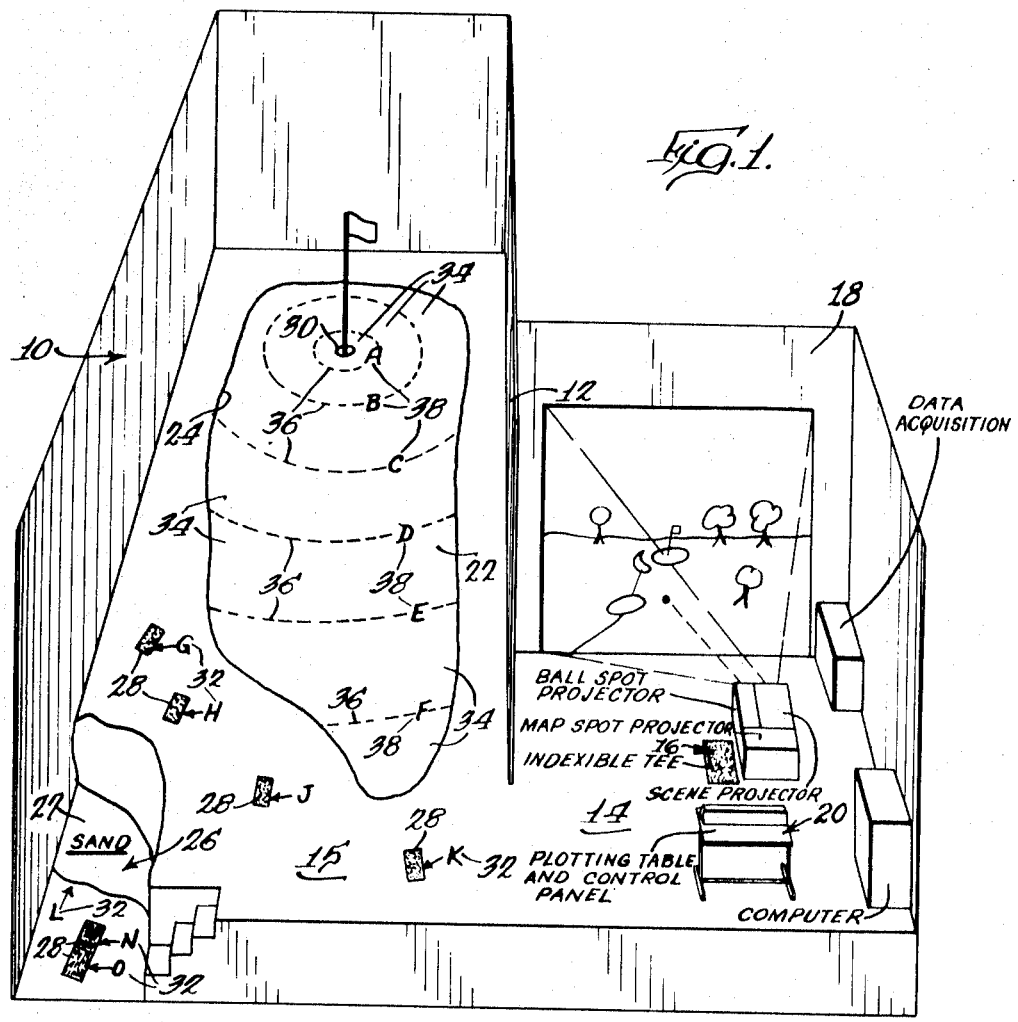
FIG. 1 is a perspective view of an indoor golf game made according to the invention.

One form of an indoor golf game with which a plotting device made according to the invention is ideally suited for use is illustrated in FIG. 1. An L-shaped room, generally designated 10 is divided by a partial wall 12 into a tee area 14 and a green area 15.

The tee area 14 includes a tee generally designated 16 which preferably is of the type disclosed in the copending application of Anderson, Ser. No. 545,411, filed Apr. 26, 1966, now abandoned and assigned to the same assignee as the instant application, the details of which are herein incorporated by reference. More specifically, the tee 16 is capable of disposing any one of a plurality of differing lie simulating mats in a position from which a golfer may drive a golf ball. The details of the construction of the tee 16 may be ascertained by reference to the above-cited Anderson application.

Forwardly of the tee 16 is a screen 18 which is adapted to receive projected indicia representative of the scene on a golf course. One form of a projector that is particularly suited for projecting scenes on the screen 18 is disclosed in the copending application of Pratt et al., Ser. No. 574,218, filed Aug. 22, 1966, and assigned to the same assignee as the instant application and to this end, the projector may be provided with a film strip 17 (FIG. 10) bearing the images of a plurality of different scenes on a golf course. The relation of each scene to the game will be described in greater detail hereinafter.

Behind the tee 16 there is placed a plotting table and control console, generally designated 20, which, it will be seen, is used by the golfer for determining the results of his previous shot and manipulating the controls for the projector and the tee 16 accordingly.

The green area 15 includes a green 22 which is defined by the area enclosed by a line 24. Additionally, there is provided a bunker 26 in one corner of the portion of the room 10 forming the green area 15. The bunker 26 may have sand or a sand simulating mat 27 disposed therein so as to permit sand shots to the green 22.

Around the green 22 there are placed a plurality of differing mats 28 which differ from each other either in their distance from a cup 30 or in the material of which they are fabricated so as to simulate differing lies around the edge of a green. For example, one of the mats 28 may simulate a fringe type of surface while another may simulate the well known "frog hair."

Adjacent the sand material 27 and each of the mats 28 is a characteristic indicia and arrow combination 32 that identifies each mat 28 and is used in conjunction with the plotting device to indicate to the golfer from which mat he should hit his next shot toward the cup 30. The indicia and arrow combinations 32 may be stenciled or otherwise printed on the material forming the floor surface of the green area 16.

The green 22 is marked off into a plurality of distinct zones 34 by a plurality of arcuate lines 36 that are drawn concentrically about the cup 30 at predetermined distances therefrom. Each of the lines 36 is associated with a unique marker 38 which is used in a manner similar to the use of the indicia and arrow combinations 32 and will be described in greater detail hereinafter.

Turning now to FIG. 2, there will be seen one form of a golf hole map that may be used in playing the golf game. Of course, it will be understood that at least 18 such maps are to be used in the golf game in order to allow a golfer to play 18 different holes. If desired, additional maps may be used to give a golfer a choice of courses on which to play.

The map of a golf hole is printed on a sheet 39 in any suitable manner and includes a first continuous line 40 which defines the boundaries of the fairway. In order to distinguish the fairway from other portions of the course as shown on the map, the area enclosed by the line 40 may be colored a medium green. A second line 42 surrounds the line 40 and the area between the lines 40 and 42 is considered to be the area of the rough on the golf hole. In order to distinguish the rough from the fairway, the area between the lines 40 and 42 may be colored a dark green. Any area outside of the line 42 may be considered to be out of bounds.

A number of continuous lines 44 enclose areas which are sand traps on the golf hole and may be colored a sand color. Another continuous line 46 lies wholly within the line 40 and defines the green on the hole. In order to distinguish the green from the fairway and the rough, it may be colored a light green. There are also provided a pair of lines 48 and 50 which define a water hazard behind the green and the area between the lines 48 and 50 may be colored blue.

The lines 40, 42 and certain of the lines 44 together with other lines 52 divide the map into a plurality of zones, some of the zones being in the fairway, some in the rough and some in certain of the sand traps. Each such zone is given a code number 54 as indicated and at some point in the zone there is a small circle 56.

There are also provided a plurality of zones on and around the green defined by the line 46 all of which are within the area defined by a dotted line 58 and one of the lines 50 defining the water hazard. The zones within the dotted line 58 and not on the green defined by the line 46 are defined by the line 40, certain of the lines 44 and other lines 60. Each such zone has a code number 62 associated therewith.

The green defined by the line 46 is also divided into a plurality of zones by continuous lines 64, each line having a code number 66 associated therewith. In actuality, the lines 64 are drawn in the form of concentric circles about a center zone identified by the code number "A" in FIG. 2, the center of which is considered to be the location of the cup on the hole.

As will be apparent from a comparison of FIGS. 1 and 2, the code number 62 which represents zones just off of the green correspond to the arrow and indicia combinations 32 that correspond to a particular distance from the cup 30 for a particular lie condition. Similarly, the lines 64 and associated code numbers 66 correspond to the lines 36 and the code numbers 38 on the green 22 in the green area 15. The purpose of the correspondence will be described in greater detail hereinafter.

Figure 3:
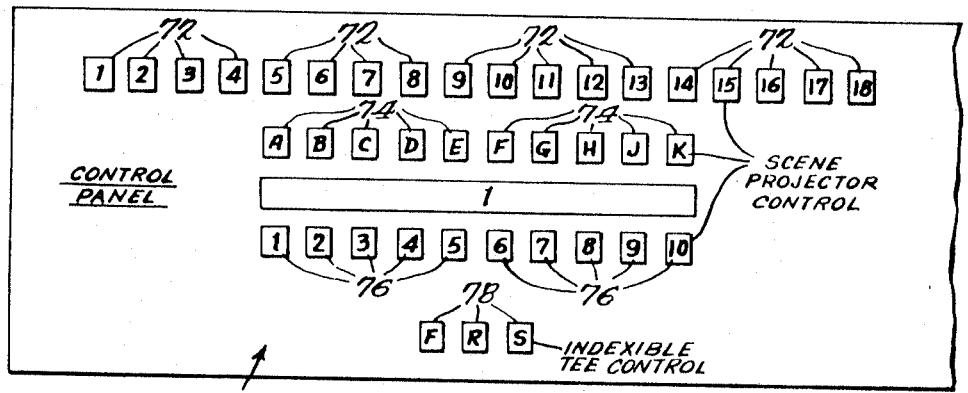
FIG. 3 is a front elevation of a control panel used in the golf game.

A portion of a control panel, generally designated 70, is illustrated in FIG. 3 and, as will be seen, comprises a portion of the plotting table and control console 20 shown in FIG. 1. The control panel 70 includes four distinct sets of pushbuttons which are used to operate switches that may control the scene selection of a projector and the lie material selection of an indexable tee.

Specifically, the first three sets of pushbuttons 72, 74 and 76, respectively, are used to control the scene projector. The first set of pushbuttons 72 have corresponding indicia from one to 18 and correspond to the hole on the course that the golfer is playing at any given instant. Thus, a golfer playing the fifth hole would depress the pushbutton 72 labeled "5." The second and third sets of push buttons 74 and 76 are used to select a given scene on any given hole on the course in accordance with the zone from which the player is hitting the ball. For example, if the player were hitting the ball from the tee on a golf course, he would depress the push button 74 labeled "A" and the pushbutton 76 labeled "1." Similarly, if he were playing from a zone bearing a code number "E7," he would depress the pushbutton 74 labeled "E" and the pushbutton 76 labeled "7."

When a plurality of golfers play the game, it will be apparent that they will generally be playing the same hole simultaneously. Thus, a single set of the pushbuttons 72 may be provided while a set of pushbuttons 74 and 76 may be provided for each golfer.

The manner in which the pushbuttons 72, 74, and 76 may be made to operate to select a corresponding scene for disposition on the screen 18 may be obtained from the aforementioned application of Pratt et al. now U.S. Pat. No. 3,528,733 relating to a projection system, the details of which are herein incorporated by reference.

The fourth set of pushbuttons 78 are used to operate the tee 16. Three pushbuttons 78 are provided, one being labeled "F" for fairway, one labeled "R" for rough and the last being labeled "S" for sand. Thus, if a golfer was about to make a shot from the fairway, he would depress the pushbutton 78 labeled "F" to cause a fairway simulating mat to be disposed at the tee 16. Similarly, if the golfer was forced to make a sand shot in the tee area 14, he would depress the pushbutton labeled "S" to cause a mat that simulated the lie in a sand trap to be disposed at the tee 16. As in the case of the pushbuttons 74 and 76, a set of pushbuttons 78 may be provided for each golfer. The manner in which the mats are disposed at the tee 16 in response to manipulation of the pushbutton 78 is disclosed in the aforementioned application of Anderson, the details of which are herein incorporated by reference.

Of course, in order to permit the golfer to properly manipulate the pushbuttons 74, 76 and 78, the golfer must first be provided with information relative to the zone in which his previous shot terminated and the nature of the lie in that zone. Because of the color coding of the map of the golf hole mentioned previously, it will be apparent that once a golfer is appraised of the zone in which his previous shot terminated, he will have no difficulty in properly manipulating the pushbutton 78. For example, if the golfer's shot came to rest in a zone that was colored dark green, the golfer would know immediately that the pushbutton 78 marked "R" should be depressed in order to move a mat simulating the lie in the rough to the tee 16. Similarly, if the golfer's shot terminated in a sand colored zone or a medium green colored zone, he would be informed that he should manipulate the pushbuttons 78 to select the sand simulating mat or the fairway simulating mat, respectively.

Therefore, it will be apparent that it is only necessary to inform the golfer as to which zone his previous shot terminated. Specifically, a map spot projector is arranged to project a spot of light to the zone on the map in which the previous shot terminated. In order to provide the map spot projector with information relative to the preceding shot, a computer is used. In the exemplary embodiment of the invention, the computer system disclosed in the copending application of Russell et al., Ser. No. 588,922, filed concurrently herewith now U.S. Pat. No. 3,513,707 and assigned to the same assignee as the instant application is used.

Referring to FIG. 4, there is provided a date acquisition system 80 which may be arranged in conjunction with the tee area 14 to detect information relative to each shot hit from the tee 16. The information thus acquired by the data acquisition system 80 is then fed to a computer 82 which utilizes the acquired information to compute the instantaneous displacement of the golf ball along three mutually perpendicular axes at all points in the flight of the ball.

Specifically, the computer includes a Z-distance determining circuit 84 which determines the instantaneous displacement of a ball from the tee in a Z direction, which direction is considered to be parallel to a horizontal straight line extending from the tee 16 to the cup of the hole along which the golfer will generally intend to hit the ball. The computer 82 also includes an X distance determining circuit 86 which continuously computes the instantaneous displacement of the ball in an X direction which is considered to be a horizontal direction transverse to the Z direction. That is to say, the X direction is the right-left direction as seen in either FIG. 1 or FIG. 2.

The computer 82 also includes a Y distance determining circuit 88. The Y distance determining circuit 88 continuously computes the instantaneous displacement of the ball above the ground with reference to the horizontal plane defined by the X and Z directions. Of course, at the end of a flight of a ball, the distance in the Y direction will always be equal to zero since the ball will be on the ground.

For specific details of the nature of the data acquisition system 80 and the computer 82, reference may be had to the above cited copending application of Russell et al., the details of which are herein incorporated by reference.

The circuits 84, 86 and 88 provide output signals which are ultimately fed to a ball spot projector, generally designated 90, which projects a spot of light on the screen 18 in a movable manner to simulate the flight of the ball as is well known in the art. The ball spot projector 90 includes a Z system 92 which controls the size of the spot of the light on the screen 18 so as to give the illusion of distance in the Z direction, an X system 94 which moves the spot of light to the right or to the left on the screen 18 in accordance with the initial direction of the shot and/or spin, and a Y system 96 which raises or lowers the spot on the screen to provide the golfer with a perceptible indication of the height that the shot is traveling above the ground at any given point in the flight thereof.

The Z system 92 is controlled by a Z servocontrol circuit 98 which is operated by the output of the Z circuit 84.

The X and Y systems 94 and 96, respectively, are operated in a slightly different manner. Specifically, a differential amplifier 100 is arranged to receive the output of the X circuit 86 and to operate a magnetic modulator and servo amplifier circuit 102, the output of which is fed through the normally closed contact 104a of a switch 104 as an input to the X system 94 of the ball spot projector 90. The X system 94 of the ball spot projector 90 also includes a feedback loop which is connected as an input to the differential amplifier 100 by means of the normally closed contact 106a of a switch 106.

The Y system 96 receives the output of a magnetic modulator and servo amplifier circuit 108 which is fed through the normally closed contact 110a of a switch 110. The Y system 96 also includes a feedback loop which is provided through the normally closed contact 112a of a switch 112 as an input to a differential amplifier 114 which provides the input to the magnetic modulator and servo amplifier circuit 108. The input to the differential amplifier 114 derived from the computer 82 is provided from the Y circuit 88 through the normally closed contact 116a of a switch 116 to the differential amplifier 114.

As a result of the above-described construction, throughout the flight of the ball, the computer 82 will provide the ball spot projector 90 with control inputs through the control circuitry just described that will properly position the projected ball spot on the screen 18 at all points during the calculated flight of the ball.

It will be recognized that is not necessary for scene and lie selection purposes for a golfer to know the location of the ball relative to the hole at all points during the flight thereof. Rather, it is only necessary to know where the shot terminated. Thus the computer 82 includes a circuit 118 that detects when the flight of the ball has terminated as computed by the computer 82. When the circuit 118 has determined that the flight of the ball has terminated, it will energize a thermal relay 120 which is of the conventional type that will maintain itself energized for approximately two seconds after its initial energization and then turn itself off. The thermal relay 120 serves as an operator for the switches 104, 106, 110, 112 and 116 which are ganged so as to be operated simultaneously.

map spot projector that generally similar to the ball spot projector 96 includes an X system 122 and a Z system 126. As will be seen, the X system 122 causes movement of a projected spot of light in the X direction on a map of a hole on a golf course such as the map illustrated in FIG. 2. That is the system 122 moves the projected spot of light in a right-left direction when referenced to the map illustrated in FIG. 2. when referenced to the map illustrated in FIG. 2.

The Z system 126 causes movement of the spot projector 124 in the Z direction on a map such as that illustrated in FIG. 2. In other words, the Z system 126 moves the projected spot of light in the up-down direction as seen in FIG. 2.

The X system 126 includes in input which is connected to the normally open contact 104b of the switch 104 and an output for feedback purposes which is connected to the normally open contact 16b of the switch 106. The z system includes an input connected to the normally open contact 110b of the switch 110 and a feedback output connected to the normally open contact 112b of the switch 112.

When the thermal relay 120 is operated, the switch 104 will be closed through its normally open contact 104b to ultimately connect the X circuit 86 to the X system 122 of a map spot projector 124 to provide the latter with the information relative to the position of the ball in the X direction. Simultaneously, the closing of the switch 106 through its normally open contact 106b will provide the differential amplifier 100 with feedback from the X system 122 of the map spot projector 124.

The switches connect and 112 will close through their normally open contacts 110b and 112b to disconnect the Y system 96 of the ball spot projector 90 and connect the Z system 126 of the map spot projector into the system. Of course, some further change need be made because the differential amplifier 114 that services the Z system 126 of the map spot projector 124 is connected to the Y circuit 88 of the computer. Accordingly, the switch 116 is provided and when the thermal relay 120 is energized, the switch 116 will be caused to be closed through its normally open contact 116b thereby disconnecting the Y circuit 88 as an input to the differential amplifier 114 and connecting the Z circuit 84 as an input thereto. The thermal relay 120 will then maintain the circuit in the just described condition for approximately 2 seconds which permits the X system 122 and the Z system 126 of the map spot projector 124 to fully respond to the outputs of the computer 82 which will remain constant because the ball is no longer moving. At the end of the two second interval, the thermal relay 120 will automatically turn itself off and reconnect the ball spot projector 96 in readiness for a subsequent computer cycle on another shot.

The just-described arrangement permits the double use of the differential amplifiers 100 and 114 and the magnetic modulators and servo amplifiers 102 and 108 in controlling both the ball spot projector 90 and the map spot projector 124 thereby providing a substantial reduction in the number of parts required for the use of both projectors. Of course, if desired, a separate set of differential amplifiers and magnetic modulators and servo amplifiers could be used for the map spot projector.

The manner in which the inputs from the computer 82 to the map spot projector 124 are utilized to control the position of a projected spot of light is illustrated schematically in FIG. 5. A light source 130 is associated with one end of an elongated tube 132 which may be provided with a suitable optical mask and lens system so as to direct a beam of light toward a movably mounted mirror 134. The mirror 134 may be pivoted about one axis to move the position of the projected spot of light in the Z direction, i.e. parallel to the intended line of flight. In order to pivot the mirror 134 so as to move the spot in the Z direction, a servo motor 136 is provided. A potentiometer 138 is associated with the output shaft of the servo motor 136 to be positioned responsive thereto and provide the feedback mentioned earlier.

The mirror 134 is also pivotally mounted for movement about a second axis transverse to the first axis so as to cause movement of the projected spot in the X direction, i.e. the right-left direction as viewed in FIG. 2. In order to move the mirror 134 about the second axis, there is provided a servo motor 140 which has a potentiometer 142 associated with its output shaft for feedback purposes.

The specific mechanical construction of the map spot projector 124 is disclosed in the copending application of Baldwin et al., Ser. No. 588,813, filed concurrently herewith and assigned to the same assignee as the instant application. The projector mechanism disclosed in the Baldwin et al. application controls the projected spot in three ways. Two of the control parameters relate to the moving of the spot along two mutually perpendicular axes so that the projected spot may be located at any position on a two dimensional spot receiving surface. The third control feature involves a regulation of the size of the projected spot.

As the map spot projector 124 only requires movement of the projected spot along two mutually perpendicular axes, the system used for controlling the size of the projected spot may be omitted.

The manner in which the map spot projector 124 is utilized will now be described. As seen in FIGS. 6 and 7, a suitable overhead support, generally designated 150, is secured to the ceiling of the room 10 housing the indoor golf game. The plotting table and control console 20 is located below the overhead support 150.

The map spot projector 124 is supported by the overhead support 150 in such a manner that the mirror 134 thereof will project the spot of light downwardly toward the upper surface of the plotting table and control console 20. Additionally, the overhead support 150 mounts a reference spot projector 152 which projects a fixed spot of light downwardly.

The console and table construction 20 is divided into a first portion mounting the control panel 70 and a table portion generally designated 156. The table 156 includes a cutout pocket 158 for storing a plurality of the sheets 39 bearing the maps of the differing golf holes that may be played. Additionally, an elongated, dovetailed slot 160 is provided in the upper surface of the table 156 and runs the length thereof. A map mounting member 162 is received in the dovetailed slot 160 for longitudinal movement therein. The map supporting member 162 is, in turn, adapted to support one of the sheets 39 bearing a map of a golf hole for movement therewith. Thus, a golf hold map is mounted for movement along the longitudinal axis of the dovetailed slot 160.

The golf hole map is additionally mounted for movement relative to the map supporting member 162 about a vertical axis coinciding with the center of the zone labeled "A" as seen in FIG. 2. That is to say, the map is mounted for pivotal movement about a vertical axis coinciding with the location of the cup in the putting green on the map.

Since as mentioned previously, it is desirable to be able to use a plurality of the maps so that a golfer may complete 18 holes or more, it is preferable that the mounting of the map on the map-supporting member 162 be such as to permit pivotal movement about the axis described above and, additionally, be a releasable connection to facilitate ready interchanging of the maps as the golfer proceeds from hole to hole. Referring now to FIG. 7 and 8, one form of a suitable connection will be described.

Near one end of the map-supporting member 162 there is provided a frustoconical recess 164 that has its lower base terminating in a hemispherical recess 166. The underside of the sheet 39 on which the map is printed includes a frustoconical projection 168 which mounts at its lower base a hemispherical projection 170. The hemispherical projection 170 is formed of a magnetic material.

Referring specifically to FIG. 8, it will be seen that the frustoconical recess 164 is formed directly in the map-supporting member 162 while the hemispherical recess 166 is formed in a magnet 172 which is supported by the map-supporting member 162 as an integral part thereof.

Dimensions of the recesses and projections are arranged so that the projections will nest in the recesses and may be rotated therein about the aforementioned vertical axis which coincides with the location of the cup on the map. Thus, the connection provides for the requisite pivotal movement. The fabrication of the hemispherical projection 170 of a magnetic material and the use of a magnet 172 in providing the hemispherical recess provides a magnetic connection which may be broken simply by lifting up upon the sheet 39 on which the map is printed.

Returning to FIGS. 6 and 7, the arrangement of the map and its various supporting elements to the map spot projector 124 and the reference spot projector 152 will be described. The map spot projector 124 is arranged, so that when the mirror 134 thereof is moved solely by the motor 136 is to provide Z directional spot movement, the locus of points on which the projected spot will fall will define a straight line within the confines of the slot 160. The reference spot projector 152, which may comprise a conventional slide projector arranged with an optical mask having an aperture of a size so as to project a suitably sized spot, is arranged to project its spot to a point on the line just mentioned. Additionally, the connection between the map supporting member 162 and the sheet 39 is arranged such that the vertical axis about which the sheet 39 may rotate relative to the map supporting member 162 will always lie on the line. The slot 160 is arranged on the table 156 so that movement of the map supporting member 162 will always be in a direction parallel to the line.

Additionally, the map spot projector is arranged with respect to the reference spot projector 152 so that their respective projected spots will coincide when the X system 122 and the Z system 126 of the map spot projector 124 are provided with data from the computer 82 that corresponds to a zero displacement in the X direction and a zero displacement in the Z direction.

Finally, the golf hole map and the sheet 39 is scaled in accordance with the degree of movement of the projected spot by the map spot projector 124 in response to a given distance representing output of the computer 82. That is to say, if the computer 82 will cause the map spot projector 124 to move a spot two inches in the Z direction for a one hundred yard shot, then the map is scaled so that two inches thereon corresponds to one hundred yards on the hole. It is to be noted that the same scale is to be used for each of the maps as the only actual cooperation between the computer and the map is the movement of the projected spot along the latter by the former.

In actuality, the scaling of the map may be limited by such factors as the room available for the table 156, the maximum size in which a map may be made and still be easily manipulated by a golfer, etc. In such a case, the reverse of the above-described system for scaling the map is utilized. Rather, the map scale is chosen and the drive arrangements for the mirror 134 of the map spot projector 124 are modified accordingly. When a projector such as that disclosed in the above cited application of Baldwin et al. is used, the projector may be made to move the spot in accordance with the scale of the map by appropriately selecting the rise of the cams used in the drive system for the mirror.

As a result of the just described orientation, it will be apparent that the spot of light projected by the spot projector 124 will always move through the point defining the cup on the map of the golf hole when the spot projector 124 has its mirror 134 moved solely by the motor 136 no matter what the position of the sheet 39 relative to the map-supporting member 162 or the position of the latter within the slot 160.

The manner in which the system is operated will now be described. Assuming that the golfer is about to make his tee shot on the first hole of a course, he will manipulate the pushbutton 72 designated "1" to indicate to the projector that it should select a scene from the group of scenes pertinent to the first hole. A golfer will also line up the reference spot projected by the reference spot projector 152 so that it falls upon the small circle 56 associated with the tee area on the map on the first hole. If it be assumed that the map shown in FIG. 2 represents the map of the first hole, the golfer will cause the spot projected by the reference spot projector 152 to fall on the small circle 56 associated with the zone designated "A1." A golfer will also manipulate the pushbuttons 74 and 76 by depressing the pushbutton 74 designated "A" and the pushbutton 76 designated "1" to enable the scene projector to project a scene on the screen that represents the view from the point of the small circle in the zone "A1" on the first hole. The scene projector will respond in the manner described in the above-cited Pratt et al. application to display the scene "A1" for the first hole which is taken to correspond to the view from the tee of the first hole on the golf course.

The golfer will also depress the pushbutton 78 designated "F" in that a tee shot is always hit from a fairwaylike lie so as to dispose the proper lie material at the tee 16 in the manner described in the aforementioned application of Anderson et al. He may then proceed to hit his shot, and as a result, the computer 82 will undergo a cycle thereby operating the ball spot projector 96 to project a spot of light on the screen 18 in a manner that simulates the flight of the ball as calculated by the computer 82. When the latter determines that the flight has ended, it will switch its outputs from the ball spot projector 96 to the map spot projector 124 which will respond by moving its projected spot of light to the point of termination of the shot.

If it be assumed that the point of termination of the shot as indicated by the spot of light projected by the map spot projector 124 lies in the zone "D2" as seen in FIG. 2, the golfer will then depress the pushbutton 74 marked "D" and the pushbutton 76 marked "2" to cause the projector to display a scene taken to correspond to the view from the zone "D2" on the first hole of the golf course. Because of the color coding of the map, the golfer will observe that the zone D2 lies in the rough, and accordingly, the golfer will then manipulate the pushbutton 78 designated "R" to cause a lie material simulating the rough to be disposed at the tee 16. The golfer will then move the sheet 39 bearing the map relative to the table 156 and the map-supporting member 162 so that the reference spot projector will project its spot 152 downwardly onto the small circle 56 associated with the zone "D2" as indicated in FIG. 2. The golfer may then hit his second shot.

The computer 82 will then cycle accordingly and let us assume that it ultimately moves the spot projected by the map spot projector 124 to a point lying in the zone designated "F9." a The golfer will then manipulate the pushbuttons 74 and 76 so as to cause the scene projected to display a scene representative of the view from the zone "F9" in the manner generally described earlier. Additionally, the golfer will observe that the zone "F9" lies within a sand trap and he will manipulate the pushbutton 78 designated "S" so as to cause a sand trap simulating mat to be disposed at the tee 16. Finally, he will reorient the map so that the reference spot projector 152 will project its spot on the small circle 56 in the center of the zone "F9" and then proceed to take his third shot on the hole.

The computer will again cycle and let us assume at this point it causes the map spot projector 124 to project its spot onto the zone labeled "H" in FIG. 2. The golfer will observe that since the spot is within the area defined by the dotted line 58 and the line 50, further shots do not require the use of the computer. Accordingly, the golfer will then pick up a golf ball and proceed to the green area 16 to place the ball on the mat 28 bearing an arrow and indicia combination 32 that corresponds to the zone adjacent the green at which the preceding shot terminated as illustrated by the position of the projected spot of the map spot projector 124. The golfer will then proceed to hole out the ball in the cup 30 in the customary manner. Had the shot from the zone "F9" not fallen short of the green but fallen within one of the zones defined by the concentric circles 64, the golfer would proceed to the line 36 on the green 22 bearing the marker 38 that corresponded to the indicia 66 associated with the zone on the green in which the ball spot projector 124 indicated that the shot terminated. For example, if the map spot projector 124 indicated that the shot terminated in the zone labeled "C" as seen in FIG. 2, the golfer would then place his ball on the line 36 marked "C."

The just described system is also particularly well suited for handling a plurality of players. The system is constructed so that when a plurality of golfers are playing the game, one golfer may be shooting while another golfer may be orienting the map for a shot just completed and observing the indication of the point of termination so that he may operate the projector and the tee in readiness for his next shot so as to save time.

Specifically, it will be appreciated that once the thermal relay 120 relaxes after its initial energization which connects the map spot projector 124 to the computer 82, the map spot projector 124 will remain in the condition called for by the computer 82 even though it is disconnected therefrom until the thermal relay 120 is again energized following a computer cycle for a succeeding shot. Thus, the map spot projector 124 serves to memorize the point of termination of the preceding shot until it is again energized for the succeeding shot which will occur only when the flight of the succeeding shot has terminated.

Accordingly, a golfer may take a shot and thereafter, while the subsequent golfer is getting ready to shoot, orient the map in the manner described previously and observe the codes that are pertinent to a succeeding shot. In other words, rather than orienting the map, taking a shot and then observing the map, the golfer may take a shot and then substantially simultaneously orient the map and observe the point of termination of the shot while another golfer is shooting.

As an additional time saving feature, golfers other than the one making the shot may perform the map orienting and the projector and tee programming for the golfer making is making the shot.

From the foregoing, it will be apparent how the computer how the computer 82 operates in conjunction with the map spot projector 124 and a map of a golf hole to provide the golfer with information necessary to operate other equipment appropriately and to designate the areas around the green area 15 where the ball should be placed when the golfer has hit the ball from a point in close proximity to the green. It will be appreciated that the relative simplicity of the system provides for a complete golf game system that may be easily operated by a golfer and makes use of the golfer to provide certain functions such as scene selection, lie material selection, etc., to render the system economically practicable for present commercial exploitation.

Having described specific embodiment of our invention for exemplary purposes, we do not wish to be limited to the specific details set forth, but rather, to have our invention construed according to the following claims.

We claim:

1. A plotting device for use in a golf game having a computer that provides output signals representative of the distance a ball struck from a tee would have traveled in a first direction coinciding with an intended line of flight and in a second direction transverse to said first direction, said plotting device comprising; a substantially planar map of a hole on a golf course, said map including indicia defining a cup for the hole, means for supporting said map, means associated with said map and said support means for providing a pivotal and releasable connection therebetween, said connection providing for pivotal movement of said map on said support means about an axis coincident with said cup and perpendicular to the plane of said map, means for projecting a stationary reference spot of light on said map, means for projecting a movable spot of light on said map and including first moving means for moving said movable spot in one direction on said map and a second moving means for moving said movable spot on said map in a second direction transverse to said one direction, both of said moving means being adapted to be controlled by said computer, and means mounting said support means for movement in some one direction.

2. The invention of claim 1 wherein said first moving means is adapted to move said movable spot in a straight line on said map when said second moving means is not operated, said reference spot projecting means being oriented to project said stationary reference spot to a point on said straight line and said support means being oriented to locate said cup on said straight line.

3. The invention of claim 1 wherein said support means and mounting means comprise a table, and a pocket in said table for storing a plurality of said maps.

4. The invention of claim 1 wherein said map is divided into a plurality of zones each being marked with a unique code; said mounting means additionally mounting a control panel; and manually operable control means for selecting one of said zones for projection mounted on said panel, said control means including unique indicia corresponding to said code.

5. A plotting device for use in a golf game comprising: means for indicating a reference point and a point movable with respect to said reference point, said indicating means being adapted to locate said movable point in response to the output of a computer; means providing a map of a golf hole including indicia defining a cup location and associated with said indicating means so that the latter, when operated by a computer, will indicate the point of termination of a shot on said map; and means mounting said indicating means and said map-providing means for relative movement (a) about a pivotal axis coinciding with said cup location, and (b) along a second axis that intersects said pivotal axis.

6. The invention of claim 5 wherein said indicating means include first means for moving said movable point in one direction and second means for moving said movable point in a second direction different from said first direction whereby said movable point may be located at any point on said map-providing means.

7. The invention of claim 5 wherein said map is divided into a plurality of zones, each having a unique code associated therewith; and manually operable means for controlling scene selection of an indoor golf game said scene selection means having a corresponding code associated therewith whereby a golfer may manipulate said manually operable scene selection means to select a scene of said indoor golf game for a subsequent shot in accordance with information relative to a preceding shot provided by said indicating means and said map providing means.

8. The invention of claim 5 wherein said map-providing means includes indicia defining a green area divided into a plurality of zones, each having unique indicia associated therewith adapted to correspond to unique indicia associated with corresponding zones on an indoor green area associated with an indoor golf game whereby said plotting device will enable a golfer to locate this ball in an appropriate zone on said indoor green area to hole out therefrom.

9. A plotting device for use in a golf game having a computer that provides output signals representative of the distance a ball struck from a tee would have traveled in a first direction generally coinciding with an intended line of flight and in a second direction transverse to said first direction, said plotting device comprising: a map of a hole on a golf course, means for supporting said map, means for projecting a stationary reference spot of light on said map, means for projecting a movable spot of light on said map and including first moving means for moving said movable spot on said map in one direction along a line and a second moving means for moving said movable spot on said map in a second direction transverse to said one direction, both of said moving means being adapted to be controlled by a computer, means mounting said support means for movement in said one direction, and means associated with said map and said support means for providing a pivotal connection therebetween, said connection providing pivotal movement of said map on said support means about an axis intersecting said line and generally perpendicular to said map.

10. A plotting device for use in a golf game comprising: means for indicating a reference point and a point movable with respect to said reference point, said indicating means being adapted to locate said movable point in response to the output of a computer; means providing a map of a golf hole and associated with said indicating means so that the latter, when operated by a computer, will indicate the point of termination of a shot on said map; and means mounting said indicating means and said map providing means for a relative movement (a) about a pivotal axis, and (b) along a second axis that intersects said pivotal axis.

* * * * *